United States Patent [19]

Messerly

[11] 4,018,847

[45] Apr. 19, 1977

[54] FLEXIBLE COATING COMPOSITIONS

[75] Inventor: James William Messerly, Stow, Ohio

[73] Assignee: The B. F. Goodrich Company, Akron, Ohio

[22] Filed: Oct. 1, 1975

[21] Appl. No.: 618,631

[52] U.S. Cl. .......................... 260/831; 260/830 P; 260/836; 260/837 R

[51] Int. Cl.[2] ........................................ C08L 63/00

[58] Field of Search ................... 260/831, 836, 365

[56] References Cited

UNITED STATES PATENTS

| | | | |
|---|---|---|---|
| 3,480,691 | 11/1969 | Jeff | 260/831 |
| 3,673,275 | 6/1972 | Simms | 260/837 R |
| 3,686,359 | 8/1972 | Soloatos | 260/831 |
| 3,853,815 | 12/1974 | Lubowitz | 260/836 |
| 3,865,683 | 2/1975 | Schnee | 260/831 |
| 3,894,112 | 7/1975 | Pagel | 260/830 R |
| 3,943,187 | 3/1976 | Wu | 260/831 |
| 3,966,837 | 6/1976 | Riew | 260/836 |

Primary Examiner—Paul Lieberman
Attorney, Agent, or Firm—Charles A. Crehore; J. H. Powell, Jr.

[57] ABSTRACT

Flexible coating compositions comprise (A) 100 parts by weight of at least one amine-terminated liquid polymer; (B) from about 10 to about 50 parts by weight of at least one epoxy resin; (C) from about 20 to about 100 parts by weight of at least one phenol-aldehyde resin. The compositions can be applied in liquid form by brushing, dipping, spraying or the like, and cured at room temperature or by heating.

12 Claims, No Drawings

FLEXIBLE COATING COMPOSITIONS

BACKGROUND OF THE INVENTION

Prior art flexible coatings commonly used in the automotive industry may have mediocre low temperature impact resistance and typically fail upon impact at temperatures below −20° F. Moreover, the surface to be painted must typically be prepared using at least one and typically more than one of the following steps in order to insure adequate adhesion of the paint to the surface: degreasing the surface by washing it with a solvent such as toluene or the like; sensitizing the surface using benzophenone or the like; and irradiating the surface with ultraviolet light. New flexible coatings are desired which overcome these prior art deficiencies.

SUMMARY OF THE INVENTION

Flexible coating compositions comprise

A. 100 parts by weight of at least one amineterminated liquid polymer containing an average from about 1.7 to about 3 amine groups per molecule, said groups being primary, secondary or a mixture thereof, and said polymer having the formula

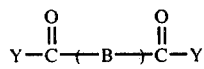

wherein Y is a univalent radical obtained by removing hydrogen from an amine group of an aliphatic, alicyclic, heterocyclic or aromatic amine containing from 2 to 20 carbon atoms and at least two amine groups, at least two of said amine groups being primary, secondary or a mixture thereof, and B is a backbone comprising carbon-carbon linkages, B. from about 10 to about 50 parts by weight of at least one epoxy resin containing at least an average of about 1.7 epoxy groups per molecule, said resin having an epoxy equivalent weight from about 70 to about 6,000 and C. from about 20 to about 100 parts by weight of at least one phenol-aldehyde resin.

DETAILED DESCRIPTION

Amine-terminated Liquid Polymers

The amine-terminated liquid polymers suitable for use in this invention have the formula

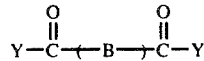

wherein y is a univalent radical obtained by removing hydrogen from an amine group of an aliphatic, alicyclic, heterocyclic or aromatic amine containing at least two primary and/or secondary amine groups, and B is a polymeric backbone comprising carbon-carbon linkages. Generally the carbon-carbon linkages comprise at least about 90% by weight of total polymeric backbone weight, more preferably at least about 95% by weight of total polymeric backbone weight. The amine-terminated polymers contain an average from about 1.7 to about 3 primary and/or secondary amine groups per molecule, more preferably an average from about 1.7 to about 2.3 primary and/or secondary amine groups per molecule. The amine-terminated polymers may have Brookfield viscosities (measured using a Brookfield RVT viscometer at 27° C) from about 500 cps to about 2,500,000 cps, more preferably from about 500 cps to about 500,000 cps.

The amine-terminated liquid polymers can be prepared easily by reacting a carboxyl-terminated or ester-terminated liquid polymer having a carbon-carbon backbone with at least one aliphatic, alicyclic or heterocyclic amine containing at least two primary and/or secondary amine groups. Amine-terminated liquid polymers can also be prepared easily by reacting an acid chloride-terminated liquid polymer having a carbon-carbon backbone with at least one aliphatic, alicyclic, heterocyclic or aromatic amine containing at least two primary and/or secondary amine groups.

The carboxyl-terminated liquid polymers used in this invention may have Brookfield viscosities from about 500 cps to about 500,000 cps, more preferably from about 500 cps to about 250,000 cps, and have polymeric backbones comprising carbon-carbon linkages. The carboxyl functional groups are located at least at the ends of a polymer molecule, but there may also be additional group(s) located pendant to a polymer backbone. The average number of total carboxyl groups typically is from about 1.7 to about 3 groups per molecule, more preferably from about 1.7 to 2.3 groups per molecule.

Carboxyl-terminated liquid polymers having carbon-carbon backbone linkages may contain polymerized units of at least one vinylidene monomer having at least one terminal $CH_2{=}C{<}$ group and selected from the group consisting of (a) monoolefins containing 2 to 14 carbon atoms, more preferably 2 to 8 carbon atoms, such as ethylene, propylene, isobutylene, 1-butene, 1-pentene, 1-hexene, 1-dodecene and the like; (b) dienes containing 4 to 10 carbon atoms, more preferably 4 to 8 carbon atoms, such as butadiene, isoprene, 2-isopropyl-1,3-butadiene, chloroprene, and the like; (c) vinyl and allyl esters of carboxylic acids containing 2 to 8 carbon atoms such as vinyl acetate, vinyl propionate, allyl acetate, and the like; (d) vinyl and allyl ethers of alkyl radicals containing 1 to 8 carbon atoms such as vinyl methyl ether, allyl methyl ether, and the like; and (e) acrylic acids and acrylates having the formula

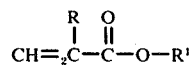

wherein R is hydrogen or an alkyl radical containing 1 to 3 carbon atoms and $R^1$ is hydrogen or an alkyl radical containing 1 to 18 carbon atoms, more preferably 1 to 8 carbon atoms, or an alkoxyalkyl, alkylthioalkyl, or cyanoalkyl radical containing 2 to 12 carbon atoms, more preferably 2 to 8 carbon atoms. Even more preferably $R^1$ is hydrogen or an alkyl radical containing 1 to 8 carbon atoms. Examples of suitable acrylates include ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, β-cyanoethyl acrylate, cyanooctyl acrylate, methyl methacrylate, ethyl methacrylate, octyl methacrylate and the like. Often two or more types of these polymerized monomeric units are contained in the polymeric backbone.

More preferred liquid polymers contain polymerized units of at least one vinylidene monomer having at least one terminal $CH_2=C<$ group and are selected from the group consisting of (a) monoolefins containing 2 to 14 carbon atoms, more preferably 2 to 8 carbon atoms; (b) dienes containing 4 to 10 carbon atoms, more preferably 4 to 8 carbon atoms; and (e) acrylic acids and acrylates having the formula

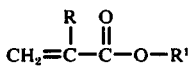

wherein R is hydrogen or an alkyl radical containing 1 to 3 carbon atoms and $R^1$ is hydrogen or an alkyl radical containing 1 to 18 carbon atoms, more preferably 1 to 8 carbon atoms, or an alkoxyalkyl, alkylthioalkyl, or cyanoalkyl radical containing 2 to 12 carbon atoms, more preferably 2 to 8 carbon atoms. Even more preferably $R^1$ is hydrogen or an alkyl radical containing 1 to 8 carbon atoms. Excellent results were obtained with dienes containing 4 to 10 carbon atoms, more preferably 4 to 8 carbon atoms.

The vinylidene monomers described above may be polymerized readily with from 0% to about 50% by weight, more preferably from 0% to about 35% by weight, of at least one comonomer selected from the group consisting of (f) vinyl aromatics having the formula

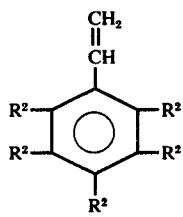

wherein $R^2$ is hydrogen, halogen or an alkyl radical containing from 1 to 4 carbon atoms, such as styrene, α-methyl styrene, chlorostyrene, vinyl toluene, and the like; (g) vinyl nitriles having the formula

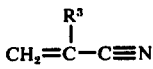

wherein $R^3$ is hydrogen or an alkyl radical containing 1 to 3 carbon atoms, such as acrylonitrile, methacrylonitrile and the like; (h) vinyl halides such as vinyl bromide, vinyl chloride and the like; (i) divinyls and diacrylates such as divinyl benzene, divinyl ether, diethylene glycol diacrylate, and the like; (j) amides of α,β-olefinically unsaturated carboxylic acids containing 2 to 8 carbon atoms such as acrylamide and the like; and (k) allyl alcohol and the like. Liquid polymer compositions comprising polymerized units of a major amount of at least one vinylidene monomer listed in (a) to (e) with a minor amount of at least one comonomer listed in (f) to (k) are within the scope of this invention.

More preferred comonomers may be selected from the group consisting of (f) vinyl aromatics having the formula

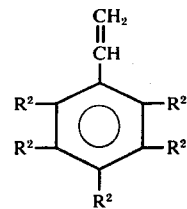

wherein $R^2$ is selected from the group consisting of hydrogen, halogen and alkyl radicals containing 1 to 4 carbon atoms; and (g) vinyl nitriles having the formula

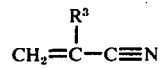

wherein $R^3$ is hydrogen or an alkyl radical containing 1 to 3 carbon atoms. Excellent results were obtained using styrene and acrylonitrile.

Examples of useful liquid polymeric backbones comprising carbon-carbon linkages include polyethylene, polyisobutylene, polyisoprene, polybutadiene, poly(vinyl ethyl ether), poly(ethylacrylate) and poly(butylacrylate) as well as copolymers of butadiene and acrylonitrile; butadiene and styrene; vinyl acetate and isoprene; vinyl acetate and chloroprene; vinyl ethyl ether and diallyl ether; vinyl ethyl ether and α-methyl styrene; vinyl ethyl ether and vinyl bromide; methyl acrylate and butadiene; methyl acrylate and ethyl acrylate; methyl acrylate and butyl acrylate; methyl acrylate and 2-ethylhexyl acrylate; ethyl acrylate and ethylene; ethyl acrylate and isobutylene; ethyl acrylate and isoprene; ethyl acrylate and butadiene; ethyl acrylate and vinyl acetate; ethyl acrylate and styrene; ethyl acrylate and chlorostyrene; ethyl acrylate, styrene and butadiene; ethyl acrylate and n-butyl acrylate; ethyl acrylate, n-butyl acrylate and 2-ethylhexyl acrylate; ethyl acrylate and 2-ethylhexyl acrylate; ethyl acrylate; ethyl acrylate and vinyl bromide; ethyl acrylate and acrylic acid; ethyl acrylate and acrylamide; ethyl acrylate and allyl alcohol; butyl acrylate and styrene; butyl acrylate and acrylonitrile; butyl acrylate and vinyl chloride; and the like.

Liquid carboxyl-terminated polymers may be prepared by free-radical polymerization using carboxyl-containing initiators and/or modifiers as disclosed in U.S. Pat. No. 3,285,949 and German Pat. No. 1,150,205 and by solution polymerization using lithium metal or organo-metallic compounds and post-treating the polymers to form carboxyl groups as disclosed in U.S. Pat. Nos. 3,135,716 and 3,431,235. The polymers can also be prepared by reacting liquid polymers having other than terminal carboxyl groups with compounds so as to yield carboxyl groups. For example, liquid carboxyl-terminated polymers can be prepared from liquid hyroxyl-terminated polymers by reaction with dicarboxyl compounds or anhydrides. Liquid halogen-terminated polymers can be reacted with unsaturated anhydrides in the presence of Lewis acids to yield carboxyl groups. Thus, it is seen that the method of preparing the liquid carboxyl-terminated polymer is not critical to the invention. The essential features of the polymer are that it have at least terminal carboxyl groups and a polymeric backbone of carbon-carbon linkages.

Examples of preferred liquid carboxyl-terminated polymers include carboxyl-terminated polyethylene, carboxyl-terminated polyisobutylene, carboxyl-terminated polybutadiene, carboxyl-terminated polyisoprene, carboxyl-terminated poly(ethylacrylate), as well as carboxyl-terminated copolymers of butadiene and acrylonitrile and of butadiene and styrene. Carboxyl-terminated copolymers of butadiene with acrylonitrile or styrene were found to be especially useful. These polymers may contain from about 50% to about 99.6% by weight of butadiene, from about 0% to about 40% by weight of acrylonitrile or styrene and from about 0.4% to about 10% by weight of carboxyl, based upon the total weight of polymer.

The carboxyl-terminated liquid polymers can be esterified with an aliphatic monohydric alcohol by methods well known to the art in order to produce ester-terminated liquid polymers. For example, a carboxyl-terminated polymer and an aliphatic monohydric alcohol can be reached in a distillation column or under reflux in the presence of a small amount of an acid catalyst. Suitable acid catalysts include organic acids containing 1 to 12 carbon atoms, more preferably 1 or 8 carbon atoms, such as acetic acid, propionic acid, benzoic acid, monoesters and diesters of orthophosphoric acid, alkarylsulfonic acids such as p-toluenesulfonic acid, and the like; inorganic acids such as boric acid, hydrochloric acid, phosphoric acid, sulfuric acid and the like; and Lewis acids such as tetraisopropyl titanate and the like. The amount of acid catalyst used may be as little as about 0.01% up to about 5% by weight based upon total reactant weight. Suitable aliphatic monohydric alcohols for use in the esterification reaction contain from 1 to 12 carbon atoms, more preferably from 1 to 6 carbon atoms, and have boiling points below about 150° C., more preferably below about 100° C. Primary aliphatic monohydric alcohols are preferred. Examples of suitable aliphatic monohyric alcohols include alkanols containing from 1 to 6 carbon atoms, such as methanol, ethanol, 1-propanol, 2-propanol, 1-butanol, 2-hexanol, 3-hexanol, and the like. Other suitable aliphatic monohydric alcohols include 2-methoxyethanol, 2-ethoxyethanol and the like. Excellent results may be obtained using ethanol, 1-propanol or 1-butanol.

The carboxyl-terminated liquid polymers can be acylated by methods well known to the art in order to produce acid chloride-terminated liquid polymers. For example, a carboxyl-terminated polymer can be reacted with thionyl chloride to produce an acid chloride-terminated polymer. HCl and $SO_2$ are evolved primarily as gases and are separated easily from the acid chloride-terminated polymer, and any excess thionyl chloride can be removed easily by vacuum distillation or by washing with a solvent such as methanol. Other suitable but less preferred acylation agents include phosphorus trichloride and phosphorus pentachloride.

Amines which react well with the carboxyl-terminated, ester-terminated and acyl-terminated polymers described heretofore include aliphatic amines containing from 1 to 20 carbon atoms, more preferably from 1 to 12 carbon atoms, and at least two, more preferably two, primary and/or secondary amine groups. Also suitable are alicyclic amines containing from 4 to 20 carbon atoms, more preferably from 4 to 12 carbon atoms, and at least two, more preferably two, primary and/or secondary amine groups. Heterocyclic amines may also be used which contain from 2 to 20 carbon atoms, more preferably from 2 to 12 carbon atoms, and at least two, more preferably two, primary and/or secondary amine groups. Examples of suitable amines just described include aliphatic amines such as ethylenediamine, 1,2-propanediamine, 1,3-propanediamine, 1,4-butanediamine, 2-methyl-1,2-propanediamine, 1,5-pentanediamine, 1,6-hexanediamine, 1,7-heptanediamine, 1,8-octanediamine, 1,10-decanediamine, 1,12-dodecanediamine and the like; aliphatic polyamines such as diethylenetriamine, triethylenetetramine, tetraethylenepentamine, bis(hexamethylene) triamine, 3,3'-iminobispropylamine, and the like; alicyclic diamines and polyamines such as 1,2-diaminocyclohexane, 1,8-p-methanediamine and the like; and heterocyclic diamines and polyamines such as 4-(aminomethyl)piperidine; piperazine; N-(aminoalkyl)piperazines wherein each alkyl group contains from 1 to 12 carbon atoms, more preferably 1 to 6 carbon atoms, such as N-(2-aminoethyl)piperazine, N-(3-aminopropyl)piperazine, N,N'-bis(3-aminopropyl)piperazine, and the like.

More preferably the amine just described contain at least two primary and/or secondary amine groups having different reactivities. The presence of amine groups having different reactivities makes the amine-termination reaction more likely than the coupling of the liquid polymers, and a smaller amine excess may be used in order to avoid coupling. Examples of more preferred amines include some alicyclic amines such as 1,8-p-methanediamine and the like; and some heterocyclic amines such as 4-(aminomethyl)piperidine and N-(aminoalkyl)piperazines wherein the alkyl group contains from 1 to 12 carbon atoms, more preferably 1 to 6 carbon atoms, such as N-(2-aminoethyl) piperazine, N-(3-aminopropyl)piperazine, and the like. Excellent results were obtained using N-(2-aminoethyl) piperazine.

Aromatic diamines and polyamines can be used to produce amine-terminated polymers. The high temperature required for aromatic amine reaction with carboxyl-terminated polymers causes excessive degradation of reactants and products and is therefore much less preferred. However, aromatic amines react well with the acyl-terminated polymers described heretofore. Suitable aromatic amines contain at least two primary or secondary amine groups bonded directly to at least one aromatic nucleus. Examples of suitable aromatic amines include 4,5-acenaphthenediamine, 3,5-diaminoacridine, 1,4-diaminoanthraquinone, 3,5-diaminobenzoic acid, 2,7-fluoroenediamine, 1,5-naphthalenediamine, 1,8-naphthalenediamine, 2,4-toluenediamine, 2,6-toluenediamine, o-phenylenediamine, m-phenylenediamine, p-phenylenediamine and the like.

A solvent is not required for the amine-termination reaction but may be used. Mixtures of solvents may also be used. Suitable solvents include aliphatic and cycloaliphatic ethers containing from 3 to 10 carbon atoms, more preferably from 3 to 6 carbon atoms, such as tetrahydrofuran, diethylether and the like; halogenated aliphatic hydrocarbons containing from 1 to 10 carbon atoms, more preferably from 1 to 6 carbon atoms, such as chloroform, carbon tetrachloride, 1,2-dichloroethylene, trichloroethylene, tetrachloroethylene and the like; and esters containing from 3 to 10 carbon atoms, more preferably from 3 to 6 carbon atoms, such as ethyl acetate, n-butyl acetate, hexyl acetate, benzyl acetate, methyl propionate, ethyl propionate and the like. Also suitable as solvents and more preferred are aromatic compounds having the formula

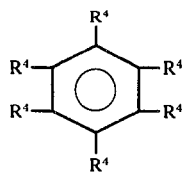

wherein $R^4$ is hydrogen, halogen or an alkyl radical containing 1 to 3 carbon atoms, and at least two $R^4$s are hydrogen. More preferably $R^4$ is hydrogen, chlorine, or an alkyl radical containing 1 to 2 carbon atoms, and at least three $R^4$s are hydrogen. Suitable aromatic solvents include benzene, chlorobenzene, toluene, o-, m- and p-xylene, o-, m- and p-diethylbenzene, cumene, mesitylene and the like.

A sufficient quantity of at least one amine described heretofore may be reacted with a carboxyl-terminated, ester-terminated or acid-chloride-terminated liquid polymer described heretofore in order to produce an amine-terminated liquid polymer containing from about 1.7 to about 3 primary and/or secondary amine groups per molecule. Typically the average number of total carboxyl, ester or acid chloride groups in a liquid polymer before reaction will be from about 1.7 to about 3 groups per molecule, more preferably from about 1.7 to about 2.3 groups per molecule. In this typical case, from about 1.2 to about 6 mole equivalents and more, more preferably from about 1.2 to about 3 mole equivalents of at least one amine described heretofore can be used per mole equivalent of carboxylated, esterified or acylated liquid polymer described heretofore. However, when the carboxylated, esterified or acylated liquid polymer also contains polymerized therein appreciable amounts of acrylic acid, acrylates or the like, the amount of amine reacted should be limited so that the amine-terminated liquid polymer contains no more than an average of about 1.7 to about 3 primary and/or secondary amine groups per molecule.

No catalyst is required, and many types of mixing apparatus can be used in the amine termination reaction. For example, simple mixers can be used, including turbine stirrers as well as propeller mixers. Reaction components can be combined in any order. The reaction mixture may be heated (or refluxed if a solvent is used) at a temperature from about 80° to about 150° C, typically for about 1 to 6 hours. The amine-terminated liquid polymer may be purified by vacuum distillation or by washing with a solvent such as a benzene-methanol mixture, followed by drying the polymer. Amine content of the amine-terminated liquid polymers can be analyzed qualitatively by infrared spectroscopy. Amine content can also be analyzed quantitatively following the procedure described by Siggia, *Quantitative Organic Analysis via Functional Groups*, N.Y., Wiley and Sons, Inc., 1963, pp. 452–456.

Epoxy Resins

Epoxy resins suitable for use in this invention together with amine-terminated liquid polymers contain at least an average of about 1.7 epoxy groups per molecule, more preferably from about 1.7 to about 3 epoxy groups per molecule, and even more preferably from about 1.7 to about 2.3 epoxy groups per molecule. The epoxy resins may be liquids or low-melting solids but are preferably liquids having a bulk viscosity from about 200 centipoises to about 2,000,000 centipoises (measured using a Brookfield RVT viscometer at 25° C). The epoxy resins can have an epoxy equivalent weight (gram molecular weight per epoxy group) from about 70 to about 6,000, more preferably from about 70 to about 2,000. Non-cycloaliphatic epoxy resins are preferred and include epoxidized cyclic silane, epoxidized soybean oil, polyglycidyl esters of polycarboxylic acid, epoxidized polyolefins, and glycidyl ether resins, with glycidyl ether resins being more preferred. A non-cycloaliphatic epoxy resin may be defined as a resin in which an epoxy group is not itself part of a cycloaliphatic ring structure. Examples of suitable polyglycidyl esters of polycarboxylic acids include the diglycidyl ester of linoleic dimer acid, the triglycidyl ester of linoleic trimer acid and the like. Suitable glycidyl ether resins include polyallyl glycidyl ether; the diglycidyl ether of chlorendic diol; the diglycidyl ether of dioxanediol; the diglycidyl ether of endomethylene cyclohexanediol; epoxy novolac resins; alkanediol diglycidyl ethers; alkanetriol triglycidyl ethers; and the like.

More preferred glycidyl ether resins include alkanediol diglycidyl ethers having the formula

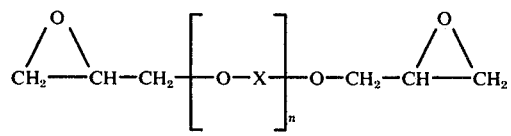

wherein X is an alkylene or alkylidene group containing from 1 to 10 carbon atoms, more preferably from 2 to 6 carbon atoms, and n is from 1 to 25, more preferably from 1 to 15. Suitable alkanediol diglycidyl ethers include ehtylene glycol diglycidyl ether, propylene glycol diglycidyl ether, butanediol diglycidyl ether and the like.

Other more preferred glycidyl ether resins include alkanetriol triglycidyl ethers wherein the alkane group contains from 2 to 10 carbon atoms, more preferably from 3 to 6 carbon atoms, such as glyceryl triglycidyl ether, the triglycidyl ether of trimethylolpropane and the like. Another more preferred class of glycidyl ether resins is the di- and polyglycidyl ethers of bisphenols, the bisphenols having the formula

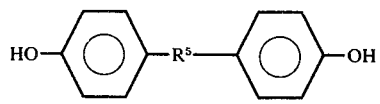

wherein $R^5$ is a bivalent radical containing 1 to 8 atoms of C, O, S and/or N, more preferably an alkylene or alkylidene groups containing 1 to 8 carbon atoms, and even more preferably an alkylene or alkylidene groups containing 1 to 6 carbon atoms. Examples of suitable bisphenols include methylene bisphenol, isopropylidene bisphenol, butylidene bisphenol, octylidene bisphenol, bisphenol sulfide, bisphenol ether, bisphenol amine, and the like. Excellent results were obtained using isopropylidene bisphenol. Examples of suitable di- and polyglycidyl ethers include those of isopropylidene bisphenol and have the formula Aldehydes suitable for use in the resoles and novolacs described heretofore include formaldehyde, acet-

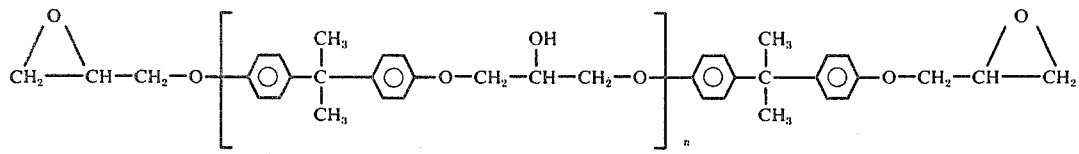

wherein *n* is from about 0 to about 20, more preferably, from about 0 to about 2.

Cycloaliphatic epoxy resins are less preferred in the compositions of this invention because they tend to produce brittle coatings and may be less reactive than non-cycloaliphatic epoxy resins. By cycloaliphatic epoxy resin is meant a resin in which an epoxy group is itself part of a cycloaliphatic ring structure. Such cycloaliphatic resins include bis(2,3-epoxycyclopentyl) ether, dicylclopentadiene dioxide, the bis(epoxydicylclopentyl) ether of ethylene glycol, 3,4-epoxycyclohexylmethyl-(3,4-epoxy)-cyclohexane carboxylate, bis(3,4-epoxy-6-methylcyclohexylmethyl) adipate, and the like. Other cycloaliphatic resins are described in Lee et al, *Handbook of Epoxy Resins*, McGraw-Hill Book Company, N.Y., 1967, Chapter 4.

Phenol-aldehyde resins suitable for use in this invention may be resoles. Resoles are prepared in a onestep reaction by reacting a molar excess of an aldehyde with a phenol in the presence of an alkaline catalyst such as ammonia, sodium hydroxide or the like. The molar ratio of aldehyde to phenol typically is from about 1.5/1 to about 2/1.

Novolacs may also be used in the compositions of this invention. Novolacs are thermoplastic resins made by reacting a molar excess of phenol with an aldehyde in the presence of an acid catalyst such as oxalic acid, hydrochloric acid, benzenesulphonic acid, p-toluenesulphonic acid or the like. The molar ratio of phenol to aldehyde typically is from about 1.1/1 to about 1.4/1, more preferably about 1.25/1. Novolacs may produce an easily-marred coating surface when used in the compositions of this invention. However, novolacs may be used together with hexamethylenetetraamine, paraformaldehyde or the like in the compositions of this invention and cured to produce the mar-resistant coatings generally desired for auto paints or the like. Hexamethylenetetramine is a preferred curative agent.

Suitable phenols for use in the resoles and novolacs described heretofore include monohydric phenols such as phenol ($C_6H_5OH$), naphthol, p-t-butylphenol, o-, m- and p-cresol, 2,4-dimethylphenol, 2,6-dimethylphenol and the like; dihydric phenols such as a resorcinol, o-methylolphenol, p-methylolphenol, 4-methylol-o-cresol and the like; trihydric phenols such as 2,4-dimethylolphenol, 2,6-dimethylolphenol, and the like; trihydric phenols such as 2,4,6-trimethylolphenol and the like; the so-called complex phenols such as cashew nut shell oil; and polyphenols such as 3-methylol-2,2′-dihydroxydiphenylmethane, 3-methylol-4,4′-dihydroxydiphenylmethane, isopropylidene bisphenol, and the like. More preferred phenols include monohydric phenols such as phenol, o-, m- and p-cresol and the like; and dihydric phenols such as o-methylolphenol, 4-methylol-o-cresol and the like. Mixtures of phenols may also be used. Excellent results were obtained using phenol, o-, m- and p-cresol, or a mixture thereof.

aldehyde, butyraldehyde, furfuraldehyde and the like, with formaldehyde being preferred. Excellent results were obtained using formaldehyde.

Flexible Coating Compositions

The flexible coating compositions of this invention comprise (A) 100 parts by weight of at least one amine-terminated liquid polymer described heretofore, (B) from about 10 to about 50 parts by weight of at least one epoxy resin described heretofore, and (C) from about 20 to about 100 parts by weight of at least one phenolaldehyde resin described heretofore, more preferably from about 35 to about 70 parts by weight of said phenolaldehyde resin. Increasing amounts of phenol-aldehyde resin have been found to substantially increase compositional cure rates. Morevoer, increasing amounts of phenol-aldehyde resin (a novolac, if used, being employed together with a curative described heretofore such as hexamethylenetetramine or the like) may substantially increase hardness of the cured compositions.

Other reactive additives are not required in the compositions of this invention. However, chain extenders may be used. Suitable chain extenders can be any of the difunctional materials known by those skilled in the art to be reactive with epoxy compounds, including dibasic aicds such as azelaic acid, phthalic acid and the like; and dimercaptans such as 1,6-hexanedithiol, 1,8-octanedithiol and the like. Also suitable as chain extenders are anhydrides such as maleic anhydride, succinic anhydride, phthalic anhydride, hexahydrophthalic anhydride and the like; diisocyanates such as 4,4′-dicylopentylmethylene diisocyanate, 4,4′-diphenylmethylene diisocyanate, 2,4-tolylene diisocyanate, 2,6-tolylene diisocyanate, 1,4-phenylene diisocyanate and the like; di- and polyamines described in detail heretofore in connection with preparation of the amine-terminated liquid polymer and including ethylenediamine, triethylenetetramine N-(2-aminoethyl)piperazine and the like; and aliphatic dihalides containing from 1 to 12 carbon atoms, more preferably aliphatic dihalides containing from 1 to 8 carbon atoms wherein the halide is bromide and/or chloride, such as 1,4-dibromobutane, 1,3-dibromobutane, 1,4-dichlorobutane, 1,2-dichloroethane, 1,4-diiodobutane, 1,6-dichlorohexane, and the like.

Also suitable as chain extenders and more preferred in this invention are dihydric aromatic compounds containing from 6 to 24 carbon atoms, more preferably from 6 to 18 carbon atoms. Suitable dihydric aromatic compounds include catechol, resorcinol, 3-hydroxybenzyl alcohol, 4-hydroxybenzyl alcohol, 1,3-dihydroxynaphthalene, 1,5-dihydroxynaphthalene, 1,7-dihydroxynaphthalene, and, even more preferably, bisphenols having the formula

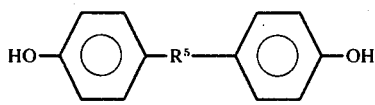

wherein $R^5$ is a bivalent radical containing 1 to 8 atoms of C, O, S and/or N, more preferably an alkylene or alkylidene group containing 1 to 8 carbon atoms, and even more preferably an alkylene or alkylidene group containing 1 to 6 carbon atoms. Examples of suitable bisphenols include methylene bisphenol, isopropylidene bisphenol, butylidene bisphenol, octylidene bisphenol, bisphenol sulfide, bisphenol sulfone, bisphenol ether, bisphenol amine and the like. Excellent results were obtained using isopropylidene bisphenol.

Curing agents may be used to supplement the reaction between the three components of the compositions of this invention but are not required. Suitable curing agents include $BF_3$-amine complexes, hexahydrophthalic anhydride, dicyandiamide, triethylenetetramine and the like.

The compositions of this invention may also contain a broad range of other compounding ingredients. These ingredients are typical ingredients used in rubber and/or epoxy compounding. Standard levels of these ingredients are used, such levels being well known in the art. A preferred limitation placed on the levels of compounding ingredients is that the composition containing these ingredients should be flowable at temperatures ranging from about 20° to about 100° C. This typically limits the amount of reinforcing fillers and other ingredients which thicken the liquid composition to levels of up to about 250 parts by weight based upon 100 parts by weight of the mixture of amine-terminated liquid polymer, epoxy resin and phenol-aldehyde resin. If a solvent is used, even higher amounts of compounding ingredients can be used.

Examples of compounding ingredients include reinforcing fillers such as carbon blacks, metal carbonates and silicates, and glass, asbestos, and textile fibers; non-reinforcing fillers such as talc, titanium dioxide and the like; colorants such as metal oxides and metal sulfides, and organic colorants; lubricants and plasticizers such as petroleum oils, castor oil, glycerin, silicones, aromatic and paraffinic oils, and alkyl and aromatic phthalates, sebacates, trimellitates, and the like; and antioxidants and stabilizers such as phenyl-$\beta$-naphthylamine, 2,6-di-t-butyl paracresol, 2,2'-methylenebis(4-ethyl-6-t-butyl phenol), 2,2'-thiobis-(4-methyl-6-t-butylphenol), 4,4'-butylidenebis-(6-t-butyl-m-cresol), tris-(3,5-di-t-butyl-4-hydroxybenzyl) isocyanurate, hexahydro-1,3, 5-tris-$\beta$-(3,5-di-t-butyl-4-hydroxyphenyl)propionyl triazine, tetrakis-methylene-3(3', 5'-di-t-butyl-4'-hydroxyphenyl)-propionate methane, distearyl thiodipropionate, tri(nonylatedphenyl)phosphite, and the like.

Solvents may be mixed with the coating compositions of this invention in order to attain a desired compositional consistency. Suitable solvents include esters containing from 3 to 10 carbon atoms, more preferably from 3 to 6 carbon atoms, such as ethyl acetate, n-butyl acetate, hexyl acetate, benzyl acetate, methyl propionate, ethyl propionate, and the like; and ketones containing from 3 to 10 carbon atoms, more preferably from 3 to 6 carbon atoms, such as acetone, acetylacetone, methyl ethyl ketone, 2,5-pentanedione and the like. Mixtures of solvents may also be used. Excellent results were obtained using butyl acetate, methyl ethyl ketone and mixtures thereof.

Modifiers may be used together with the aforementioned solvents in order to adjust consistency of the coating compositions of this invention. Suitable modifiers include aromatic compounds having the formula

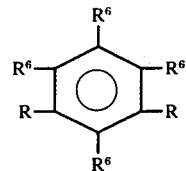

wherein $R^6$ is hydrogen, halogen or an alkyl radical containing 1 to 3 carbon atoms, and at least three $R^6$'s are hydrogen. More preferably, $R^6$ is hydrogen, halogen or an alkyl radical containing 1 or 2 carbon atoms, and at least four $R^6$'s are hydrogen. Suitable aromatic compounds include benzene, chlorobenzene, toluene, o-, m-, and p-xylene, o-, m- and p-diethylbenzene, cumene, mesitylene, and the like. Mixture of modifiers may also be used. Excellent results were obtained using toluene, xylene, and mixture thereof.

The compositional components can be mixed using mixing kettles, Henschel mixers, ink mills, Banbury mixers, or the like. At least three mixing techniques may be used. (1) All three compositional components may be mixed simultaneously. (2) The amine-terminated liquid polymer and phenol-aldehyde resin may be mixed in a first stage, followed by mixing with the epoxy resin in a second stage. (3) The epoxy resin and phenol-aldehyde resin may be mixed in a first stage, followed by mixing with the amine-terminated liquid polymer in a second stage. Pot life of coating compositions produced by any of the above three methods is typically from about 16 to about 48 at room temperature when a solvent and/or modifier is used together therewith, and from about 0.5 to about 16 hours in the absence of solvent and/or modifier. It is much less preferred to mix the amine-terminated liquid polymer and epoxy resin before adding the phenolaldeyde resin because pot life of the mixture is reduced substantially.

The compositions of this invention may be impact and mar-resistant and adhere well to a wide variety of surface materials. Such materials include natural rubber, cis-polyisoprene, cis-polybutadiene (CB), acrylonitrilebutadiene-styrene copolymers (ABS), butadiene-acrylonitrile rubbers (NBR), isoprene-acrylonitrile rubbers, butadiene-styrene rubbers (SBR), isoprene-styrene copolymers, polychloroprene and the like. Other suitable surface materials include isoprene-isobutylene (butyl) rubbers, copolymers of conjugated dienes with lower alkyl and alkoxyl acrylates, ethylene-propylene-diene polymers (EPDM), polyurethanes such as those described in Schollenberger U.S. Pat. Nos. 2,871,218 and 2,899,411, and the like. Still other suitable surface materials include wood, concrete, asphalt, stainless steel, glass, ceramic tile, polyester fabrics, tin and the like.

Surprisingly and unexpectedly, little or no preparation of surfaces to be coated may be required. For example, EPDM surfaces may require at most degreasing with a solvent such as toluene, methyl ethyl ketone or a mixture thereof. The compositions of this invention can be applied in liquid form by methods well known to the art and cured at room temperature or by heating. Such methods include brushing, dipping, spraying and the like. The coating compositions can be used as primers, intermediate coatings and adhesives, top coatings and the like wherever flexible coatings are desirable, such as on automotive bumpers and bodies and the like. Surprisingly and unexpectedly, the cured coatings typically have excellent low temperature impact resistance below −20° and often as low as −40° F and lower.

The following examples illustrate the present invention more fully.

EXAMPLES

Materials

The amine-terminated liquid polymers used in the following examples were prepared readily by following the procedures described in detail heretofore using N-(2-aminoethyl)-piperazine in the amine-termination reaction. The amine-terminated liquid polymers, identified as ATBN, were amine-terminated poly(-butadiene/acrylonitrile) copolymers having an acrylonitrile content of about 9.5% by weight of polymer (unless otherwise noted hereafter), a viscosity at 27° C of about 90,000 cps. and a molecular weight of about 3,600.

The non-cycloaliphatic epoxy resin most frequently used was a liquid diglycidyl ether of bisphenol A (DGEBA) having an epoxy equivalent weight of about 185 to 192 and a viscosity at 25° C of about 10,000 to 16,000 cps. The DGEBA resin is sold under the trademark "Epon 828" by Shell Chemical Company. Another non-cycloaliphatic epoxy resin used was the triglycidyl ether of glycerol having an epoxy equivalent weight of about 140 to 160 and viscosity at 25° C of about 100–170 cps this resin being sold under the trademark "Epon 812" by Shell Chemical Company.

The phenolaldehyde resin was a resole of phenol, o-, m- and p-cresols and formaldehyde. The resin had a softening point of 180°–210° F and an apparent specific gravity of 1.23–1.25. The latter resin is sold under the trademark "Bakelite BKR-2620" by Union Carbide Corporation.

Except for the amine-terminated liquid polymers described in detail heretofore, the non-cycloaliphatic epoxy resins, phenolaldehyde resin, and other materials used in the following examples are known commercial materials and are readily available.

Test Methods

Paint adhesion was tested by scoring from five to seven parallel lines into a coated sample using a razor blade, each line being about 3/32 inch from the next line. The coating was about 0.010 inch thick on a 6-in. × 3-in. × 0.125 in. polyetherurethane compound panel which had been solvent-wiped with toluene, methyl ethyl ketone or a mixture thereof before coating. The polyetherurethane was of the type described in U.S. Pat. No. 2,899,411. The scored lines were at least as deep as the coating. Five to seven more lines were scored at right angles to the first lines by the same method in order to form a checkerboard pattern. The test sample was aged as described hereinafter. After aging a piece of ½-inch wide adhesive tape (sold under the trademark "Scotch Brand No.600" by Minnesota Mining and Manufacturing Company) was pressed firmly over the crosshatched pattern and jerked away quickly. Paint adhesion was considered excellent if no coating stuck to the tape.

Low temperature impact was tested using a 6-in. × 3-in. × 0.125 in. polyetherurethane compound panel coated 0.010 in. thick on one side with a composition of this invention. The panel was solvent-wiped with toluene, methyl ethyl ketone or a mixture thereof before coating. The polyetherurethane was of the type described in U.S. Pat. No. 2,899,411. The panel was conditioned before testing for about four hours at the same temperature used for testing. Immediately after conditioning, the panel was flexed and its edges inserted into parallel grooves 3 inches apart in a base, with the coated side of the panel exposed. A dart rounded at the tip, 2 inches in diameter and weighing 60 lbs., was dropped from a given height onto the crown of the flexed panel (17in. and 24 in. at −20°, and 24 in. at −40° F.). The panel typically was impacted into an M-shaped configuration with the dart forcing the crown of the panel downward toward the base. The panel was examined for damage to the coating. Test results were considered excellent where there was no damage to the coating at −20° F.

Modulus, tensile strength and ultimate elongation were determined according to ASTM D412 using Die D dumbbells cut from a 0.010 in. film which had been peeled from a Teflon surface after drying. Gehman freeze point was tested following the procedure in ASTM D1053.

EXAMPLE

The following recipe was used:

| MATERIAL | WT. PARTS |
| --- | --- |
| ATBN | 100 |
| Epon 828 | 20 |
| Bakelite BKR-2620 | 50 |
| Titanium Dioxide | 45 |
| Methyl Ethyl Ketone | 200 |
| Ultramarine Blue | 0.1 |
| Total Wt. | 415.1 |

The materials above were mixed as follows. ATBN and titanium dioxide were mixed for about 5 minutes using a spatula until a coarse dispersion was obtained. The coarse dispersion was passed twice through a three-roll ink mill having 2-mil and 1-mil roll gaps in order to obtain a fine dispersion. Bakelite BKR-2620 was dissolved in 50 weight parts of methyl ethyl ketone. The dispersion and solution were mixed together with Epon 828 by stirring with a spatula, and the remaining 150 weight parts of methyl ethyl ketone were mixed therein to achieve a sprayable consistency. A 0.010-inch coating was sprayed and cured by heating in a circulating air oven for about 10 minutes at about 250° F. Test results are summarized in Table I.

TABLE I

| | |
| --- | --- |
| Tensile Strength, psi | 2850 |
| 100% Modulus, psi | 2340 |
| Ultimate Elongation at 24° C, psi | 140 |
| Gehman Freeze Pt., ° C | −57 |
| Adhesion* | Excellent |
| Adhesion** | Excellent |
| Low Temperature Impact | |

TABLE I-continued

| Resistance at −20° F. | Excellent |
|---|---|

*Cured, coated panel aged for one week at 70° C. in a circulating air oven.
**Cured, coated panel aged for one week at 70° C in a circulating air oven and thereafter for 2 hours at 100° F. in water.

Other cured, coated panels were produced using the Example I recipe with 70 weight parts instead of 50 weight parts of Bakelite BKR-2620. Low temperture impact resistance was found to be excellent at both −20° and −40° F.

Still other cured, coated panels were produced using the Example I recipe with ATBN containing about 18 Wt. % acrylonitrile instead of 10 Wt.% acryonlitrile and having a viscosity at 27° C. of about 280,000 cps. and a molecular weight of about 3,600. Low temperature impact resistance was found to be excellent at both −20° and −40° F.

EXAMPLE 2

The following recipe was used:

| MATERIALS | WT. PARTS Recipe No. 1 | Recipe No. 2 | Thinners |
|---|---|---|---|
| ATBN | 100 | — | — |
| Epon 828 | — | 20 | — |
| Bakelite BKR-2620 | 50 | — | — |
| Titanium Dioxide | 50 | — | — |
| Methyl Ethyl Ketone | 100 | 20 | 110 |
| Toluene | — | — | 50 |
| Butyl Acetate | 50 | — | 35 |
| Xylene | — | — | 20 |
| Total Wt. | 350 | 40 | 215 |

Recipe No. 1 was mixed as follows. The ATBN and titanium dioxide were dissolved in 100 weight parts of a 50/50 (by weight) solution of methyl ethyl ketone and butyl acetate. The Bakelite BKR-2620 was dissolved in 50 weight parts of methyl ethyl ketone. The two solutions were mixed together. Recipe No. 2 was prepared by dissolving the ATBN in 20 weight parts of methyl ethyl ketone. Recipe No. 2 was mixed with Recipe No. 1, and immediately thereafter the thinners listed above were added. A 0.010-inch coating was sprayed and cured by heating in a circulating air oven for about 10 minutes at about 250° F. The coating cured to a smooth, glossy surface.

I claim:
1. A composition comprising
A. 100 parts by weight of at least one amine-terminated liquid polymer containing an average from about 1.7 to about 3 amine groups per molecule, said groups being primary, secondary or a mixture thereof, and said polymer having the formula

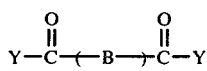

wherein Y is a univalent radical obtained by removing hydrogen from an amine group of an aliphatic, alicyclic, heterocyclic or aromatic amine containing from 2 to 20 carbon atoms and at least two amine groups, at least two of said amine groups being primary, secondary or a mixture thereof, and B is a polymeric backbone comprising carbon-carbon linkages and containing polymerized units of at least one vinylidene monomer having at least one terminal $CH_2=C<$ group, said monomer being selected from the group consisting of (a) monoolefins containing 2 to 14 carbon atoms, (b) dienes containing 4 to 10 carbon atoms, (c) vinyl and allyl esters of carboxylic acids containing 2 to 8 carbon atoms, (d) vinyl and allyl ethers of alkyl radicals containing 1 to 8 carbon atoms, and (e) acrylic acids and acrylates having the formula

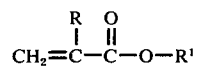

said R being hydrogen or an alkyl radical containing 1 to 3 carbon atoms and said $R^1$ being hydrogen, an alkyl radical containing 1 to 18 carbon atoms, or an alkoxyalkyl, alkythioalkyl or cyanoalkyl radical containing 2 to 12 carbon atoms,
B. from about 10 to about 50 parts by weight of at least one non-cycloaliphatic epoxy resin containing at least an average of about 1.7 epoxy groups per molecule, said resin having an epoxy equivalent weight from about 70 to about 6,000, and
C. from about 20 to about 100 parts by weight of at least one phenol-aldehyde resin, said phenolaldehyde resin being a resole or novolac, and said novolac being cured with hexamethylentetramine.

2. A composition of claim 1 wherein said carbon-carbon linkages comprise at least 90% by weight of total polymeric backbone weight, and said monomer is selected from the group consisting of (a) monoolefins containing 2 to 8 carbon atoms, (b) dienes containing 4 to 8 carbon atoms, and (e) acrylic acids and acrylates having the formula

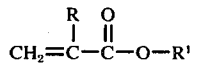

said R being hydrogen or an alkyl radical containing 1 to 3 carbon atoms and said $R^1$ being hydrogen, an alkyl radical containing 1 to 8 carbon atoms, or an alkoxyalkyl, alkylthioalkyl or cyanoalkyl radical containing 2 to 8 carbon atoms.

3. A composition of claim 2 wherein said epoxy resin is a non-cycloaliphatic epoxy resin having an epoxy equivalent weight from about 70 to about 2,000.

4. A composition of claim 3 wherein said epoxy resin is a glycidyl ether resin.

5. A composition of claim 4 wherein said epoxy resin is selected from the group consisting of (1) alkanediol diglycidyl ethers having the formula

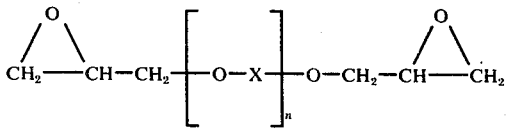

wherein X is an alkylene or alkylidene group containing from 1 to 10 carbon atoms, and n is from 1 to 25, (2) di- and polyglycidyl ethers or bisphenols, said bisphenols having the formula

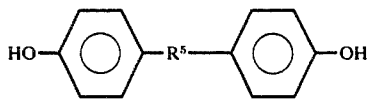

wherein $R^5$ is a bivalent radical containing from 1 to 8 atoms of at least one atom selected from the group consisting of C, O, S and N, and (3) alkanetriol triglycidyl ethers wherein the alkane group contains from 2 to 10 carbon atoms.

6. A composition of claim 5 wherein said vinylidene monomer contains copolymerized therewith from 0% up to about 50% by weight of at least one comonomer selected from the group consisting of (f) vinyl aromatics having the formula

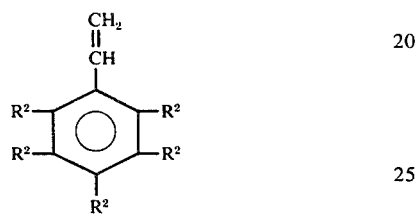

wherein $R^2$ is hydrogen, halogen or an alkyl radical containing from 1 to 4 carbon atoms, (g) vinyl nitriles having the formula

wherein $R^3$ is hydrogen or an alkyl radical containing 1 to 3 carbon atoms, (h) vinyl halides, (i) divinyls and diacrylates, (j) amides of $\alpha,\beta$-olefinically unsaturated carboxylic acids containing 2 to 8 carbon atoms, and (k) allyl alcohol.

7. A composition of claim 6 wherein said amine groups have different reactivities, and said comonomer is selected from the group consisting of (f) said vinyl aromatics and (g) said vinyl nitriles.

8. A composition of claim 7 wherein the phenol in said phenol-aldehyde resin is phenol, at least one cresol, or a mixture thereof, and said aldehyde is formaldehyde.

9. A composition of claim 8 wherein said epoxy resin is a diglycidyl ether of isopropylidene bisphenol, said amine is at least one N-(aminoalkyl)piperazine, the aminoalkyl group of said amine contains from 1 to 12 carbon atoms, said vinylidene monomer is at least one of said dienes, and said comonomer is at least one of said vinyl nitriles.

10. A composition of claim 9 wherein said diene is butadiene and said vinyl nitrile is acrylonitrile.

11. A cured composition of claim 1.

12. A process comprising reacting

A. 100 parts by weight of at least one amine-terminated liquid polymer containing an average from about 1.7 to about 3 amine groups per molecule, said groups being primary, secondary or a mixture thereof, and said polymer having the formula

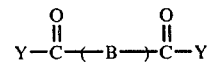

wherein Y is a univalent radical obtained by removing hydrogen from an amine group of an aliphatic, alicyclic, heterocyclic or aromatic amine containing from 2 to 20 carbon atoms and at least two amine groups, at least two of said amine groups being primary, secondary or a mixture thereof, and B is a polymeric backbone comprising carbon-carbon linkages and containing polymerized units of at least one vinylidene monomer having at least one terminal $CH_2=C<$ group, said monomer being selected from the group consisting of (a) monoolefins containing 2 to 14 carbon atoms, (b) dienes containing 4 to 10 carbon atoms, (c) vinyl and allyl esters of carboxylic acids containing 2 to 8 carbon atoms, (d) vinyl and allyl ethers of alkyl radicals containing 1 to 8 carbon atoms, and (e) acrylic acids and acrylates having the formula

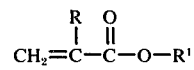

said R being hydrogen or an alkyl radical containing 1 to 3 carbon atoms and said $R^{-1}$ being hydrogen, an alkyl radical containing 1 to 18 carbon atoms, or an alkoxyalkyl, alkylthioalkyl or cyanoalkyl radical containing 2 to 12 carbon atoms, B. from about 10 to about 50 parts by weight of at least one non-cycloaliphatic epoxy resin containing at least an average of about 1.7 epoxy groups per molecule, said resin having an epoxy equivalent weight from about 70 to about 6,000, and C. from about 20 to about 100 parts by weight of at least one phenol-aldehyde resin, said phenol-aldehyde resin being a resole or novolac, and said novolac being cured with hexamethylenetetramine.

* * * * *